Nov. 4, 1958            J. J. WEIER            2,859,067

TRACTION DEVICES FOR VEHICLE WHEELS

Filed May 14, 1957            2 Sheets-Sheet 1

INVENTOR.
Jacob J. Weier.
by H. J. Sanders
Attorney.

Nov. 4, 1958  J. J. WEIER  2,859,067
TRACTION DEVICES FOR VEHICLE WHEELS
Filed May 14, 1957  2 Sheets-Sheet 2
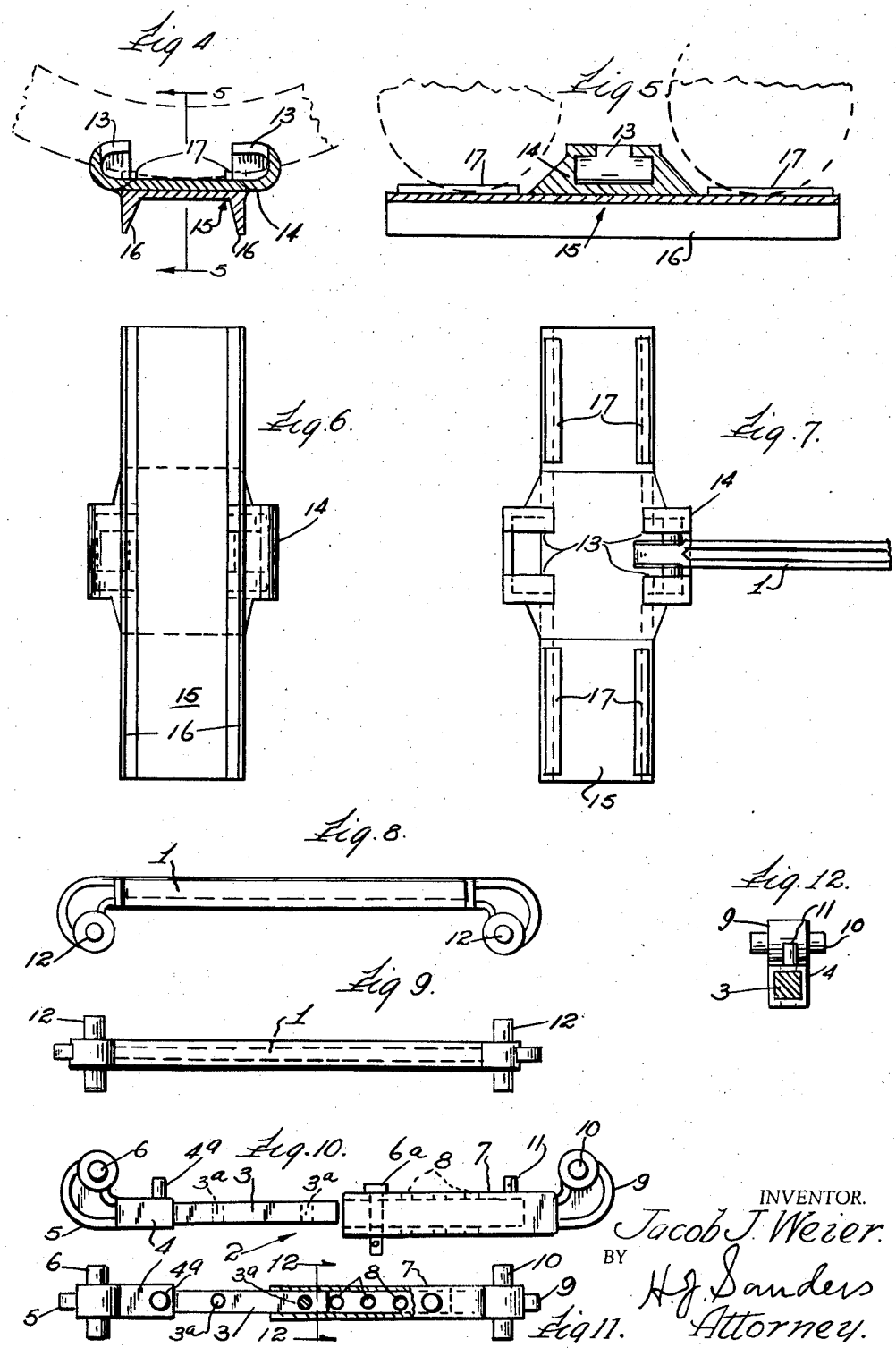
INVENTOR.
Jacob J. Weier
BY
H. J. Sanders
Attorney.

United States Patent Office 2,859,067
Patented Nov. 4, 1958

2,859,067
TRACTION DEVICES FOR VEHICLE WHEELS
Jacob J. Weier, Chicago, Ill.
Application May 14, 1957, Serial No. 659,070
10 Claims. (Cl. 305—6)

This invention relates to traction devices and more particularly to endless traction elements for motor trucks. The device is particularly adapted for application to the individual wheel units of vehicles where more than one tire is arranged side by side on a common axle, the mounting means here being disposed between the vehicle wheels.

The instant invention is a further development of the traction devices set forth in my co-pending applications for patents, Ser. No. 493,974 and Ser. No. 593,903; both filed June 26, 1956, the latter now abandoned.

One object is to provide a chain, or an endless track, type traction device wherein hook shape bars or links connected to the shoes permits the bars or links to move up and/or down vertically, or laterally in the manner of the universal joint independently without displacement of the shoes from the tires, and a device wherein the harness mechanism is disposed between the tires thus serving to keep mud from between the tires and one wherein the harness, when not in use, may be collapsed into small space to facilitate convenient storage.

A further object is to provide means whereby, when tires get out of line in travel, the instant shoes follow this movement, allowing the tires to weave but not permitting the shoes to become detached from or improperly disposed upon the tires.

With the foregoing and other objects in view my invention will be set forth in the following specification, defined in the claims and illustrating in the accompanying drawings forming part of this disclosure. In the drawings:

Fig. 4 is a fragmentary detail sectional view of the harness, a portion of one tire being shown in dotted lines.

Fig. 5 is a cross sectional view on the line 5—5 of Fig. 4.

Fig. 6 is a top plan view of a shoe and cleat.

Fig. 7 is a bottom plan view of Fig. 6 with a link attached.

Figs. 8 and 9 are side elevational and top plan views, respectively, of intermediate links employed.

Fig. 10 is a side view of a sectional connecting link showing the parts separated.

Fig. 11 is a top plan view, partly in section, of the connecting link of Fig. 10 assembled, and, Fig. 12 is a cross sectional view on the line 12—12 of Fig. 11.

Figure 1:
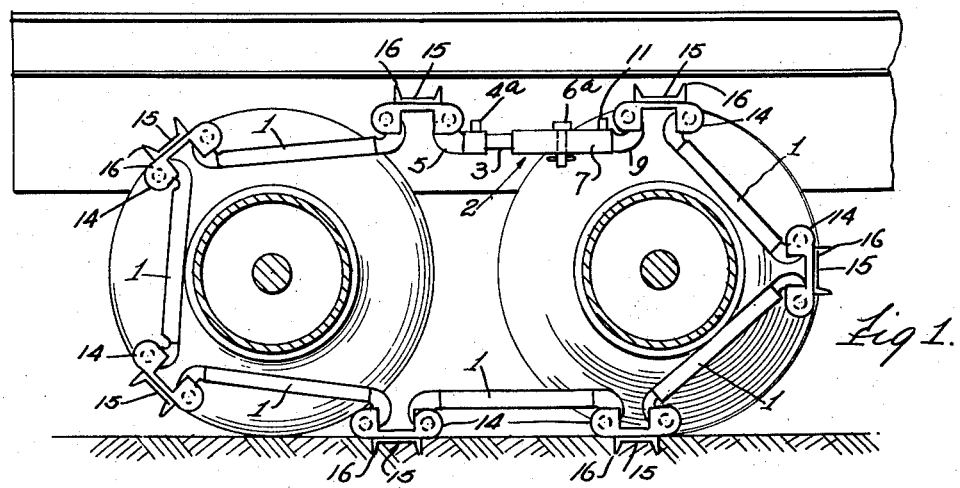
Fig. 1 is a fragmentary view of a vehicle having a pair of adjacent wheels arranged in tandem, said wheels provided with dual tires and having the instant traction device applied thereto.

My harness includes a chain formed of a plurality of terminal and intermediate links 1 of one piece structure and a terminal or connecting link 2 formed of two separable parts, a stud portion 3 of square cross section throughout the greater portion of its length, one end of said stud terminating at the desirably integral enlarged but shorter portion 4 terminating in the upwardly curved portion 5 provided at its free end with the pin 6 desirably integral with the part 5, the said short stud portion 4 provided with the pin 4a and formed with two spaced parallel perforations 3a adapted to receive a removable locking pin 6a.

Cooperating with said stud 3 and adapted to adjustably and removably receive same is the elongated socket 7 formed with a plurality of identical perforations 8 which as said stud is manually inserted in said socket 7 are selectively adapted to align with one or both of said stud perforations 3a to then receive said locking pin 6a to releasably secure said link sections together.

The said socket at its closed end is formed with the end 9 curved upwardly in the axial plane of the link when said link sections are assembled, said socket end 9 at its free termination provided with a pin 10 and adjacent the socket closed end provided with a pin 11 similar to said pin 4a and in line therewith.

Flexibly secured to opposite ends of said connecting links 2 are the adjacent ends of both terminal links of a chain composed of a plurality of intermediate links 1 of identical structure, each link 1 having its opposite ends curved in a common direction or to the same side of said body portion and each link end provided with a pin 12 extending therethrough, said pins being parallel to each other and adapted for releasable connection with the opposed slotted recessed portions 13, 13 of the C-shaped shoes 14 of hollow body structure, said pins being introduced into said shoe slotted portions to seat in opposed sides or ends of said shoes.

Each shoe 14 is provided with a transversely disposed cleat 15, welded or otherwise secured thereto, provided with flanges 16 disposed outwardly therefrom, said shoes either formed or provided with opposed spaced, parallel lips 17 arranged upon opposite lateral edges of said shoes and upon the opposite side of said shoes with respect to said cleats, said lips engaging the tire treads to provide added traction for the vehicle in operation, said lips materially assisting or preventing "spinning" of the wheel in mud or muck or snow.

Figure 2:
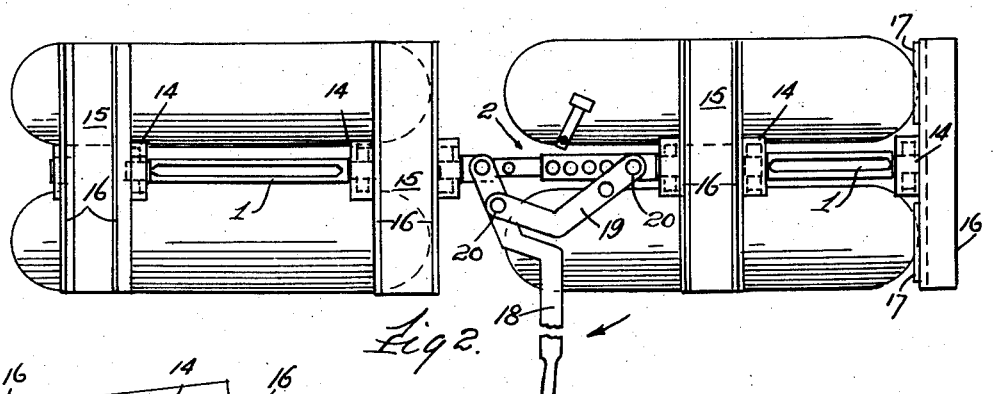
Fig. 2 is a top plan view of a pair of wheels arranged in tandem each wheel having a pair of dual tires and detachable means for applying the traction harness means to the tires.
Figure 3:
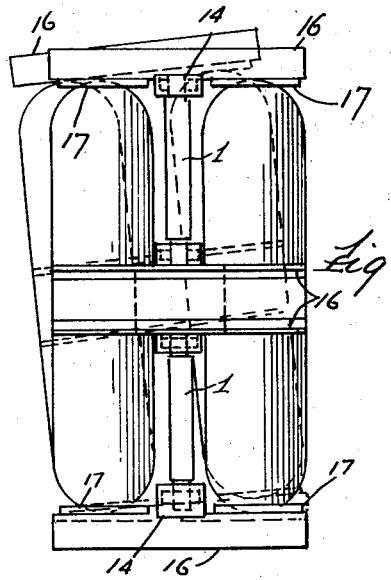
Fig. 3 is an end elevational view of Fig. 2 showing the harness flexibility that enables it to follow the tread movements.

The intermediate links are connected to each other and to said connecting link by the several shoes 14, forming the chain. In applying the harness to the tires of a dual tire type wheel the sections of the connector link are separated and the cleats placed upon the wheel tread peripheries, transversely thereof, with the chain links disposed between said treads as best shown in Fig. 3, the vehicle then moved to mount successive cleats in like positions until all are mounted whereupon the connector sections are drawn together by applying the wrench 18 to the pins 4a and 11 of stud 4 and socket 7, as shown in Fig. 2, and adjusting the connector sections as desired and locked with the locking pin 6a, and thereafter the wrench removed.

What is claimed is:
1. In a traction device for vehicle wheels arranged in tandem, the combination of wheels arranged in tandem having dual tires, a chain having a plurality of terminal and intermediate links for arrangement between the dual tires on the wheels, terminal pins carried by said terminal and intermediate links, an adjustable connector link between the terminal links, terminal pins carried by said connector link, C-shaped shoes of hollow body structure formed with opposed slotted portions arranged between adjacent ends of said terminal and intermediate links said

C-shaped shoes receiving in their slotted portions the pins of the adjacent ends of said terminal and intermediate links to secure said links in operative relation, cleats carried by said C-shaped shoes and disposed transversely thereof for arrangement upon the dual tires of said wheel, and manually operable means for locking said connector link in adjusted positions.

2. In a traction device for vehicle wheels arranged in tandem, the combination of wheels arranged in tandem having dual tires, a chain having a plurality of terminal and intermediate links for arrangement between the dual tires on the wheels, terminal pins carried by said terminal and intermediate links, a sectional connector link between the terminal links, one section of said link formed with a plurality of spaced equidistant perforations, a second section of said link having a perforated socket with perforations corresponding to the perforations of said one section adjustably receiving said second section, a locking pin for securing said sections together, terminal pins carried by said connector link, C-shaped shoes of hollow structure formed with opposed slotted portions arranged between adjacent ends of said terminal and intermediate links, said shoes receiving in their slotted portions the pins of adjacent ends of said terminal and intermediate links securing said links in operative relation, cleats carried by said shoes disposed upon the dual tires of said wheel, and wrench means for adjusting the sections of said connector link.

3. A traction device as claimed in claim 2 in which said cleats are provided with spaced lips for engaging the dual tires.

4. In a traction device for vehicle wheels arranged in tandem, the combination of adjacent wheels arranged in tandem having dual tires, a chain having a plurality of terminal and intermediate links for arrangement between the dual tires of the wheels, terminal pins carried by said terminal and intermediate links, an adjustable connector link between the terminal links, terminal pins carried by said connector link, C-shaped shoes of hollow structure formed with slotted portions arranged between adjacent ends of said intermediate links, said shoes receiving in their slotted portions the pins of adjacent ends of said terminal and intermediate links to secure said links in operative relation, cleats carried by said shoes and disposed transversely thereof for arrangement upon the dual tires of each of said wheels arranged in tandem, and manually operable means for locking said connector link in adjusted positions.

5. In a traction device for vehicle wheels arranged in tandem, the combination of adjacent wheels, arranged in tandem having dual tires, a chain having a plurality of terminal and intermediate links for arrangement between the dual tires of the wheels, terminal pins carried by said terminal and intermediate links, a sectional connector link between said terminal links, one section of said connector link formed with a plurality of spaced equidistant perforations, a second section of said connector link having a perforated socket with perforations corresponding to the perforations of said one section adjustably receiving said second section, a locking pin for securing said sections together, terminal pins carried by said connector link, C-shaped shoes having lateral recesses and longitudinal slotted portions assembled between adjacent ends of said terminal and intermediate links, said shoes receiving through their slotted portions the pins of adjacent ends of said terminal and intermediate links securing said links in operative relation, cleats carried by said shoes disposed upon the dual tires of each wheel arranged in tandem, and wrench means for adjusting the sections of said connector link.

6. A traction device for vehicle wheels arranged in tandem as claimed in claim 5 in which said cleats are provided with spaced lips for engaging the dual tires on the wheels.

7. In a traction device for vehicle wheels arranged in tandem, the combination of wheels arranged in tandem having dual tires thereon, a chain having a plurality of terminal and intermediate links and a connector link for arrangement between the dual tires on the wheels in tandem, terminal shoe connecting means carried by said terminal and intermediate links, said connector link being adjustable and arranged between said terminal links, terminal shoe connecting means carried by said connector link, C-shaped shoes of hollow structure formed with slotted portions arranged between adjacent ends of said terminal and intermediate links, said shoes receiving in their slotted portions said terminal shoe connecting means of adjacent ends of said terminal and intermediate links to secure said links in operative relation, cleats carried by said shoes and disposed transversely thereof for arrangement upon the dual tires of said wheels in tandem, and manually operable means for locking said connector link in adjusted position.

8. In a traction device for vehicle wheels arranged in tandem, the combination of wheels arranged in tandem having dual tires thereon, a chain having a plurality of terminal and intermediate links and a connector link for arrangement between the dual tires on the wheels in tandem, terminal shoe connecting means carried by said terminal and intermediate links, said connector link being adjustable and arranged between said terminal links, terminal shoe connecting means carried by said connector link, C-shaped shoes of hollow body structure with longitudinal slotted portions assembled between adjacent ends of said terminal and intermediate links, said shoes receiving in their slotted portions said terminal shoe connecting means of adjacent ends of said terminal and intermediate links to secure said links in operative relation, cleats carried by said shoes and disposed transversely thereof for arrangement upon the dual tires of said wheels in tandem, and manually operable means for attachment with said connector link for locking said connector link in adjusted position.

9. In a traction device for vehicle wheels arranged in tandem, the combination of wheels arranged in tandem having dual tires thereon, a chain having a plurality of terminal and intermediate links and a connector link for arrangement between the dual tires on the wheels in tandem, terminal shoe connecting means carried by said terminal and intermediate links, said connector link being adjustable and arranged between the terminal links, terminal shoe connecting means carried by said connector link, C-shaped shoes of hollow structure formed with slotted portions arranged between adjacent ends of said links, said shoes receiving in their slotted portions said terminal shoe connecting means of adjacent ends of said terminal and intermediate links to secure said links in operative relation, cleats carried by said shoes and disposed transversely thereof for arrangement upon the dual tires of said wheels in tandem, said cleats provided with spaced lips for engaging the tires, and manually operable means for attachment with said connector link for locking said connector link in adjusted position.

10. In a traction device for vehicle wheels arranged in tandem, the combination of wheels arranged in tandem having dual tires thereon, a chain composed of at least five (5) intermediate links and two (2) terminal links and a connector link for arrangement between the dual tires on the wheels in tandem, terminal shoe connecting means carried by said terminal and intermediate links, said connector link being adjustable and arranged between the terminal links, terminal shoe connecting means carried by said connector link, C-shaped shoes of hollow body structured formed with slotted recessed portions assembled between adjacent ends of said links, said shoes receiving in their slotted recessed portions said terminal shoe connecting means of adjacent ends of said links to secure said links in operative relation, cleats carried by said shoes and disposed transversely thereof for arrangement upon the dual tires of said wheels in tandem, and manually operable means for locking said connector link in adjusted position.

References Cited in the file of this patent

UNITED STATES PATENTS

| | | |
|---|---|---|
| 1,182,198 | Noden | May 9, 1916 |
| 1,460,657 | Kintz | July 3, 1923 |
| 2,171,547 | Galanot et al. | Sept. 5, 1939 |
| 2,432,329 | Marthinsen | Dec. 9, 1947 |
| 2,671,489 | Hendersen | Mar. 9, 1954 |
| 2,696,237 | Doughty | Dec. 7, 1954 |